United States Patent [19]

Simosato

[11] 4,384,481

[45] May 24, 1983

[54] SETUP OF IGNITION TIMING INDICATOR FOR ENGINE AND METHOD THEREBY

[75] Inventor: Noriyasu Simosato, Fujisawa, Japan

[73] Assignee: Nissan Motor Co., Ltd., Yokohama, Japan

[21] Appl. No.: 255,857

[22] Filed: Apr. 20, 1981

[30] Foreign Application Priority Data

Apr. 30, 1980 [JP] Japan .................................. 55-57669

[51] Int. Cl.[3] .............................................. G01M 15/00

[52] U.S. Cl. .......................................................... 73/116

[58] Field of Search ............... 73/117.3, 116; 324/391; 455/26; 116/291, 292, 334, 335, 298, DIG. 46

[56] References Cited

U.S. PATENT DOCUMENTS 2,837,713 6/1958 Schoenleber ........................ 324/391

3,209,919 10/1965 Hoogstoel .................... 248/220.4 X

*Primary Examiner*—Jerry W. Myracle

*Attorney, Agent, or Firm*—Lane, Aitken & Kananen

[57] ABSTRACT

An ignition timing indicator for indicating crank angle of an engine in conjunction with a measuring mark on rotary member rotatable in response to a crankshaft of the engine, is arranged not to be permanently mounted on the engine body. To do this, there are provided locating elements for temporarily locating the timing indicator at a predetermined position of the engine body without fastening the timing indicator to the engine body. Preferably, the locating elements comprise a pin fixed to the timing indicator and a locating hole formed in the engine body for fitly but removably receiving the pin of the timing indicator.

5 Claims, 3 Drawing Figures

SETUP OF IGNITION TIMING INDICATOR FOR ENGINE AND METHOD THEREBY

BACKGROUND OF THE INVENTION

The present invention relates to a setup of a timing indicator for an engine and a method thereby, and more specifically to a setup of a timing indicator which is not fixedly mounted on an engine body.

With a timing indicator, anyone who has some experience with car maintenance can easily change the ignition timing of the engine, and, therefore, the ignition timing degree prescribed by the manufacturer's specification is easily trespassed by advancing the timing to increase engine performance, for example.

To prevent improper adjustment of ignition timing, sealing tape is attached to an adjusting screw of the distributor, but this is not sufficient because it is easily broken.

BRIEF SUMMARY OF THE INVENTION

According to the present invention, a timing indicator is arranged so as not to constitute a component of an engine body; however, it is regarded as a special tool. That is, a timing indicator is not permanently mounted on an engine body, but is temporarily mounted on the engine body in place only when adjusting the engine ignition timing. Thus, the timing indicator is normally removed from the engine body, so that improper adjustment of ignition timing outside specified repair shops is prevented. To do this, there is provided means for locating the timing indicator at a prescribed position of the engine body without fastening the timing indicator to the engine body. Preferably, the locating means comprises a pin fixed to the timing indicator and a locating hole formed in the engine body for fittingly but removably receiving the pin of the timing indicator.

DESCRIPTION OF THE PREFERRED EMBODIMENTS

Figure 1:
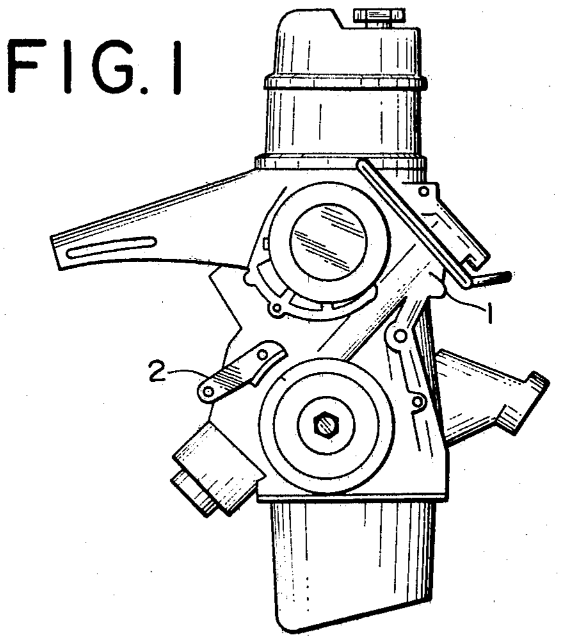
FIG. 1 is a front view of an engine body showing a position where a timing indicator is mounted.
Figure 2:
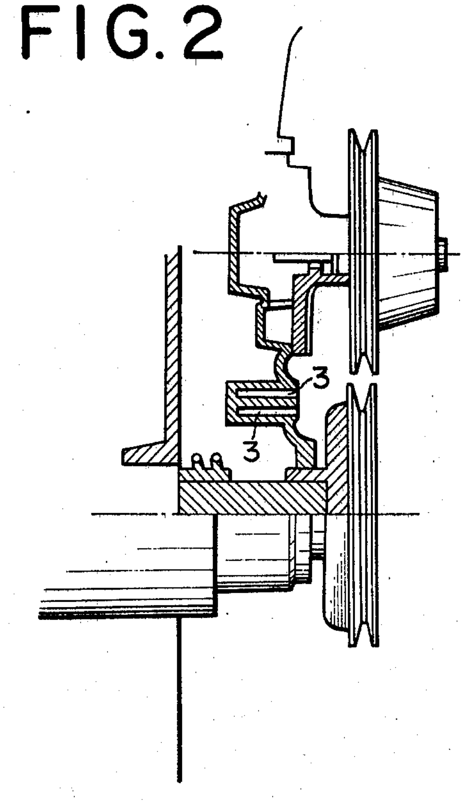
FIG. 2 is a side view partly in section of a portion of an engine body.
Figure 3:
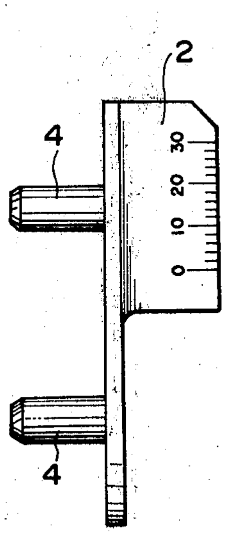
FIG. 3 is a side view of a timing indicator.

In FIG. 1, a timing indicator 2 is mounted on an engine body 1. As shown in FIG. 2, the engine body 1 is formed with a locating hole or holes 3, and, on the other hand, the timing indicator 2 has a pin or pins 4, as shown in FIG. 3. Optionally, the locating holes may be formed on the side of the timing indicator 2, and pins on the side of the engine body 1.

When adjusting the ignition timing, the timing indicator 2 which can be regarded as a special tool is mounted on the engine body at a predetermined position by inserting the pins 4 of the timing indicator 2 into the corresponding locating holes 3, respectively. After the adjustment is finished, the timing indicator 2 is removed from the engine body 1, and kept apart from the engine body 1 at ordinary times, thus to prevent a further adjustment.

Thus, the arrangement of the present invention can prevent the ignition timing from being easily and perhaps improperly adjusted, and add a valuable contribution to the problem of air pollution from automobile exhaust emission. Besides, eliminating the necessity of a timing indicator for every engine reduces the total manufacturing cost of the engine.

What is claimed is:

1. A method of adjusting ignition timing of an engine with an ignition timing indicator for indicating crank angle in conjunction with a measuring mark on a rotary member rotatable in response to the rotation of a crankshaft of the engine, the method comprising:
   - mounting temporarily the timing indicator on a body of the engine at a predetermined position relative to the rotary member,
   - adjusting the ignition timing at a predetermined crank angle by reading the crank angle from the timing indicator and the measuring mark, and
   - demounting the timing indicator from the body of the engine after adjusting the ignition timing.

2. The method as claimed in claim 1, wherein the step of mounting is further defined by the step of inserting at least one pin fixed to the timing indicator in a fitted, but removably receivable, relationship with at least one locating hole formed in the engine body.

3. The method as claimed in claim 2, wherein the step of demounting is further defined by the step of removing the pin fixed to the timing indicator from the locating hole formed in the engine body after the step of adjusting is completed.

4. The method as claimed in claim 1, wherein the step of mounting is further defined by the step of inserting at least one pin fixed to the engine body in a fitted, but removably receivable, relationship with at least one locating hole formed in the timing indicator.

5. The method as claimed in claim 4, wherein the step of demounting is further defined by the step of removing the pin fixed to the engine body from the locating hole formed in the timing indicator.

* * * * *